United States Patent
Sasaki

(10) Patent No.: US 9,862,446 B2
(45) Date of Patent: Jan. 9, 2018

(54) ELECTRICAL COMPONENT MOUNTING STRUCTURE FOR SADDLE-RIDING TYPE VEHICLE

(71) Applicant: HONDA MOTOR CO., LTD., Tokyo (JP)

(72) Inventor: Takashi Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 14/827,630

(22) Filed: Aug. 17, 2015

(65) Prior Publication Data
US 2016/0090142 A1 Mar. 31, 2016

(30) Foreign Application Priority Data

Sep. 30, 2014 (JP) ................................. 2014-201475

(51) Int. Cl.
| | | |
|---|---|---|
| B62K 19/30 | (2006.01) | |
| B62J 99/00 | (2009.01) | |
| B62K 11/04 | (2006.01) | |
| B62K 19/40 | (2006.01) | |

(52) U.S. Cl.
CPC .............. B62J 99/00 (2013.01); B62K 11/04 (2013.01); B62K 19/30 (2013.01); B62K 19/40 (2013.01); *B62J 2099/004* (2013.01); *B62J 2099/0013* (2013.01)

(58) Field of Classification Search
CPC ..... B60T 8/3685; B60T 8/3225; B62K 19/30; B62K 19/40; B62J 2099/004
See application file for complete search history.

(56) References Cited

U.S. PATENT DOCUMENTS

| | | | | |
|---|---|---|---|---|
| 2007/0145227 A1* | 6/2007 | Hasegawa | .............. | B60T 8/3685 248/637 |
| 2007/0188012 A1* | 8/2007 | Hariu | .................... | B60T 8/3685 303/3 |
| 2009/0242304 A1* | 10/2009 | Tahara | .................. | B60T 8/3685 180/219 |

(Continued)

FOREIGN PATENT DOCUMENTS

| | | | | | |
|---|---|---|---|---|---|
| JP | 2009179237 A | * | 8/2009 | ............. | B62K 11/04 |
| JP | 2011-912 A | | 1/2011 | | |
| WO | WO 03004340 A1 | * | 1/2003 | ............. | B62K 11/10 |

*Primary Examiner* — Joseph M Rocca
*Assistant Examiner* — Daniel S Yeagley
(74) *Attorney, Agent, or Firm* — Westerman, Hattori, Daniels & Adrian, LLP

(57) ABSTRACT

An electrical component mounting structure for a motorcycle includes a vehicle body frame. The vehicle body frame includes: main frames extending downwardly toward rear from a head pipe, the main frames for suspending a power unit; and pivot frames extending downward from rear ends of the main frames to be disposed at left and right in a vehicle width direction. An electrical component including a first ECU is supported in this electrical component mounting structure. In this electrical component mounting structure, the power unit includes a crankcase and a cylinder portion that protrudes from the crankcase, and the first ECU is disposed, in a side view, anterior to the left and right pivot frames, posterior to the cylinder portion, and above the crankcase.

12 Claims, 8 Drawing Sheets

(56) References Cited

U.S. PATENT DOCUMENTS

2010/0032225 A1* 2/2010 Oohashi ............... B62K 19/30
  180/219
2010/0314188 A1 12/2010 Goto
2012/0211295 A1* 8/2012 Nagai ................... B60T 8/3225
  180/219

* cited by examiner

ELECTRICAL COMPONENT MOUNTING STRUCTURE FOR SADDLE-RIDING TYPE VEHICLE

FIELD OF THE INVENTION

The present invention relates to an electrical component disposition structure for a saddle-riding type vehicle in which electrical components are disposed in a dead space in a vehicle body.

BACKGROUND OF THE INVENTION

A known structure includes a body frame connected to ends of a pair of left and right main frames, a curved bridge that protrudes upwardly and extends across left and right connections between the main frames and the body frame, and an engine control unit (ECU) disposed inside an internal space of the bridge (see, for example, Japanese Patent Laid-Open No. 2011-912).

SUMMARY OF THE INVENTION

In motorcycles, however, the position at which the electrical component, such as the engine control unit, is disposed is fixed after positions at which other components, such as a vehicle body frame, an engine, and a rear cushion are disposed are fixed. This requires that the electrical component be disposed effectively within a limited space (dead space). A space around the engine may be a possible candidate for the dead space; however, a thermal effect needs to be considered before the dead space around the engine can be properly used and it has been considered difficult to dispose the electrical component at a position near the engine.

A harness member routing structure becomes complicated, however, in a vehicle involving a large number of electrical components and it is desirable to dispose a plurality of electrical components in groups so as to achieve good maintainability. The electrical component disposition structure in the known art, however, has a limited space for disposing the electrical components and requires the addition of, for example, a cross member separate from the bridge in order to support the electrical components. Providing the separate cross member or the like increases stiffness of the entire vehicle body frame to an excessively high level, thus unfortunately reducing vehicle running performance including turning performance.

It is one object of the present invention to provide an electrical component disposition structure for a saddle-riding type vehicle capable of improving maintainability and vehicle running performance by achieving appropriate vehicle stiffness through an effective use of a dead space and collectively disposing a plurality of electrical components with due consideration given to a thermal effect.

To achieve this objective, the present invention provides an electrical component mounting structure for a saddle-riding type vehicle, including: a vehicle body frame (11), including: main frames (22) extending downwardly toward rear from a head pipe (21), the main frames (22) for suspending a power unit (45); and pivot frames (23) extending downwardly from rear ends of the main frames (22) to be disposed at left and right in a vehicle width direction, the electrical component mounting structure for supporting therein an electrical component including a first ECU (141, 175), wherein the power unit (45) includes a crankcase (42) and a cylinder portion (43) that protrudes from the crankcase (42), and the first ECU (141, 175) is disposed, in a side view, anterior to the left and right pivot frames (23), posterior to the cylinder portion (43), and above the crankcase (42).

In the above configuration, the electrical component mounting structure for a saddle-riding type vehicle preferably further includes an ECU suspension member (150) for supporting the first ECU (141), the ECU suspension member (150) including: a pair of left and right suspension stays (147) extending forwardly from the left and right pivot frames (23); and a pair of left and right cross members (148) extending inwardly in the vehicle width direction from the left and right suspension stays (147), respectively, wherein the first ECU (141) is supported in a condition of extending across the left and right cross members (148).

In the above configuration, preferably, the cross members (148) are each plate-shaped and each have thinning holes (148a, 148b) formed at least in part thereof.

In the above configuration, preferably, the first ECU (141) is elastically supported by the cross members (148).

In the above configuration, preferably, the left and right suspension stays (147) support a second ECU (142, 176) separate from the first ECU (141, 175), and the second ECU (142, 176) is disposed posterior to the first ECU (141, 175).

In the above configuration, preferably, the first ECU (141, 175) and the second ECU (142, 176) are disposed posterior to a fuel tank (66, 66L, 66R) supported by the main frames (22), and a guide portion (66p) formed at a rear portion of the fuel tank (66, 66L, 66R) is oriented such that an airflow is supplied to the first ECU (141, 175) and the second ECU (142, 176).

In the present invention, the power unit includes the crankcase and the cylinder portion that protrudes from the crankcase, and the first ECU is disposed, in a side view, anterior to the left and right pivot frames, posterior to the cylinder portion, and above the crankcase. These arrangements allow the first ECU to be disposed by effectively using a dead space created, in the side view, between the power unit and the pivot frames.

The ECU suspension member that supports the first ECU includes the pair of left and right suspension stays extending forwardly from the left and right pivot frames and the pair of left and right cross members extending inwardly in the vehicle width direction from the left and right suspension stays, respectively, and the first ECU is supported in a condition of extending across the left and right cross members. The first ECU is thus supported without the left and right pivot frames being directly connected with, for example, a part that forms part of the vehicle body frame, such as a cross member. Thus, the size of the vehicle body frame can be reduced to achieve reduction in size and weight and the stiffness of the vehicle body frame can be prevented from increasing excessively. This can achieve improved vehicle running performance, for example, turning performance.

The cross members are each plate-shaped and each have thinning holes formed at least in part thereof. This allows stiffness of the ECU suspension member to be made appropriate. Thus, the stiffness of the vehicle body frame can be prevented from becoming excessively high for the improved vehicle turning performance. Additionally, weight of the cross member can be reduced.

Because the first ECU is elastically supported by the cross members, stiffness of a connecting portion including the ECU suspension member and the first ECU and connecting between the left and right pivot frames can be made appropriate. Thus, the vehicle turning performance can be improved. Furthermore, a large external force can be prevented from being transmitted from the left and right pivot frames to the first ECU via the ECU suspension member, so that the first ECU can be protected.

The left and right suspension stays support the second ECU separate from the first ECU, and the second ECU is disposed posterior to the first ECU. Thus, the first ECU and the second ECU can be collectively disposed. This enables an even more effective use of the dead space created between the power unit and the pivot frames.

Furthermore, the first ECU and the second ECU are disposed posterior to the fuel tank supported by the main frames and the guide portion formed at a rear portion of the fuel tank is oriented such that the airflow is supplied to the first ECU and the second ECU. The guide portion of the fuel tank thus allows the first ECU and the second ECU to be cooled by the airflow blown thereagainst, so that the first ECU and the second ECU can be disposed close to the power unit.

BRIEF DESCRIPTION OF THE DRAWINGS

The present invention will be described with reference to the accompanying drawings, wherein:

FIG. 8 is a view showing the first ECU and the second ECU, and parts therearound in the second embodiment, as viewed from a direction identical to the direction in which FIG. 5 is viewed.

DETAILED DESCRIPTION OF THE INVENTION

Figure 1:
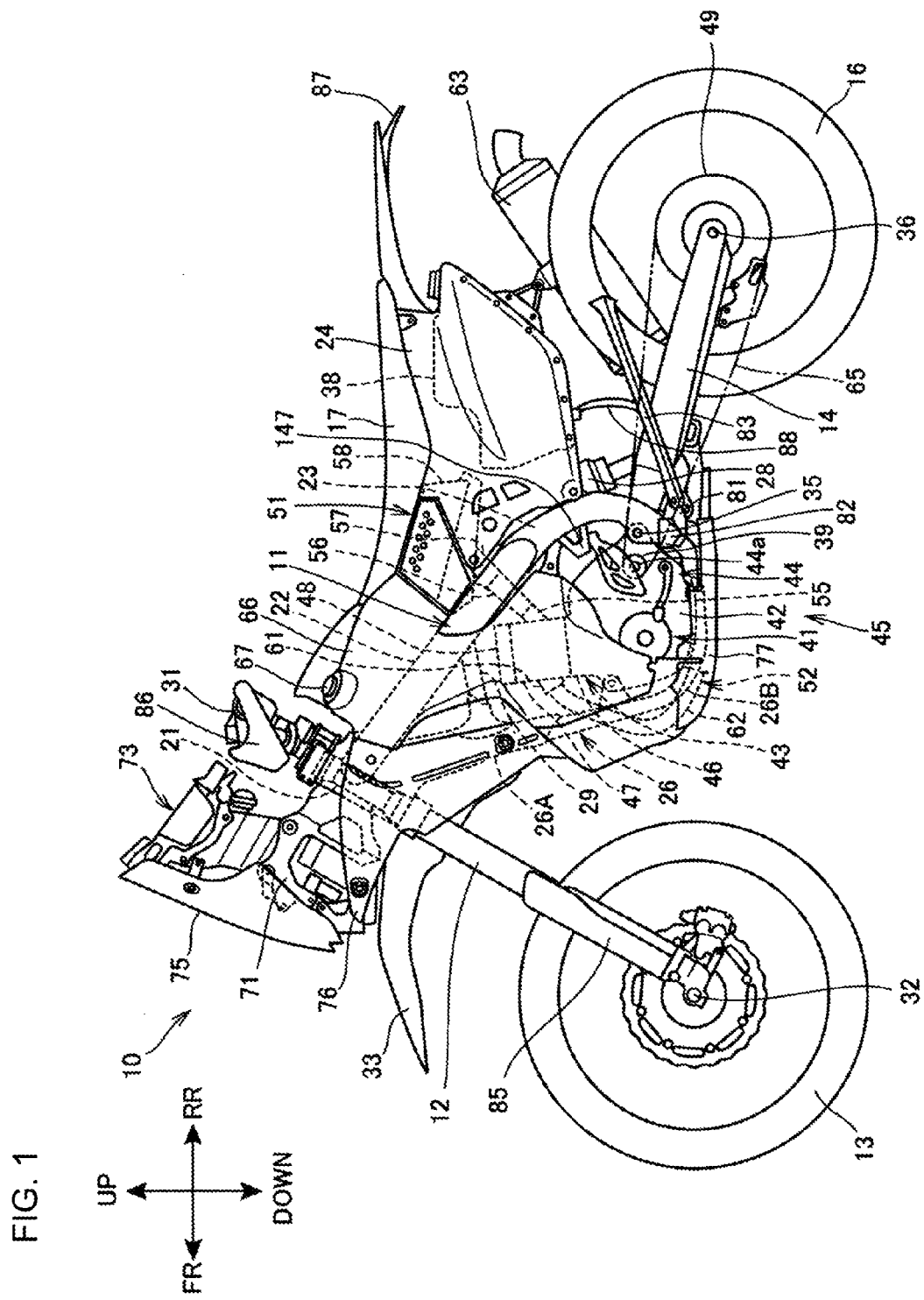
FIG. 1 is a left side elevational view showing a motorcycle including an electrical component mounting structure according to a first embodiment of the present invention.

Specific embodiments to which the present invention is applied will be described below with reference to the accompanying drawings. Throughout the descriptions given hereunder, expressions indicating directions including front and rear, right and left, and upper and lower mean the same directions as those in a vehicle body unless otherwise specified. In the drawings, an arrow FR indicates forward of the vehicle body, an arrow RR indicates rearward of the vehicle body, an arrow UP indicates upward of the vehicle body, an arrow DOWN indicates downward of the vehicle body, an arrow LH indicates leftward of the vehicle body, and an arrow RH indicates rightward of the vehicle body.

FIG. 1 is a left side elevational view showing a motorcycle 10 including an electrical component mounting structure according to a first embodiment of the present invention.

The motorcycle 10 is a saddle-riding type vehicle including a vehicle body frame 11, a front wheel 13, a rear wheel 16, and a seat 17. The front wheel 11 is supported via a front fork 12 at a front end portion of the vehicle body frame 11. The rear wheel 16 is supported via a swing arm 14 at a lower portion of the vehicle body frame 11. The seat 17 is supported at a rear portion of the vehicle body frame 11.

The vehicle body frame 11 assumes a framework of the motorcycle 10, including a head pipe 21, a pair of left and right main frames 22, a pair of left and right pivot frames 23, a rear frame 24, and a down frame 26.

The head pipe 21 constitutes the front end portion of the vehicle body frame 11. The front fork 12 is steerably supported on the head pipe 21. A handlebar 31 is mounted at an upper end portion of the front fork 12. The front wheel 13 is supported via an axle 32 at a lower end portion of the front fork 12. A front fender 33 is mounted at a position midway along a longitudinal direction of the front fork 12. The front fender 33 covers the front wheel 13 from above.

The main frames 22 extend from the head pipe 21 linearly and obliquely downwardly toward the rear in a side view. The pivot frames 23 each curve into a substantially arcuate shape so as to protrude rearwardly from a corresponding rear end portion of the main frames 22. A pivot shaft 35 is supported at a position slightly downward from portions curved most rearwardly in the pivot frames 23. A swing arm 14 has a front end portion supported vertically swingably at the pivot shaft 35. The rear wheel 16 is supported via an axle 36 at a rear end portion of the swing arm 14.

The rear frame 24 is a monocoque resin frame mounted to the pair of main frames 22 and the pair of pivot frames 23. A rear fuel tank 38 formed of a resin is mounted inside a rear portion of the rear frame 24.

The down frame 26 includes a down frame upper portion 26A that forms an upper portion of the down frame 26 and a pair of left and right down frame lower portions 26B that form lower portions of the down frame 26.

The down frame upper portion 26A extends substantially downwardly from the head pipe 21 at an angle more acute than the main frames 22 do. The down frame lower portions 26B extend downwardly from a lower end portion of the down frame upper portion 26A in a side view. The down frame lower portions 26B then branch to the right and left and further curve to extend rearwardly in a substantially horizontal direction before being connected to lower end portions of the pivot frames 23.

A plurality of cross pipes (not shown) that extend in a vehicle width direction extends across the left and right pivot frames 23. A rear cushion unit 28 is disposed across the cross pipe at an upper portion and the swing arm 14. A reinforcing frame 29 is disposed to extend across the main frames 22 and the down frame upper portion 26A. A cross pipe (not shown) is disposed to extend in the vehicle width direction across the left and right down frame lower portions 26B to connect them each other.

An engine 41 is supported on the down frame lower portions 26B and the pivot shaft 35. The engine 41 includes a crankcase 42 and a cylinder portion 43 that extends upwardly from an upper portion of a front portion of the crankcase 42. A transmission 44 is disposed as an adjunct to a rear portion of the crankcase 42. The engine 41 and the transmission 44 constitute a power unit 45.

The cylinder portion 43 includes a cylinder block 46, a cylinder head 47, and a head cover 48. The cylinder block 46 is mounted on the crankcase 42. The cylinder head 47 is mounted on an upper end portion of the cylinder block 46. The head cover 48 closes an upper portion opening in the cylinder head 47.

The cylinder block 46 has a lower portion inserted into the crankcase 42. The cylinder block 46 has a cylinder hole into which a piston (not shown) is inserted movably in a vertical direction.

An intake system 51 is connected to a rear surface of, and an exhaust system 52 is connected to a front surface of, the cylinder head 47.

The intake system 51 includes an intake pipe 55, a throttle body 56, and an air cleaner 58. The intake pipe 55 is disposed at the cylinder head 47. The throttle body 56 is connected to a rear end portion of the intake pipe 55. The air cleaner 58 is connected to a rear end portion of the throttle body 56 via a connecting tube 57. The intake pipe 55, the throttle body 56, and the connecting tube 57 extend substantially linearly and obliquely upwardly toward the rear from the cylinder head 47 to be connected to the air cleaner 58.

The exhaust system 52 includes an exhaust manifold 61, an exhaust pipe 62, and a muffler 63. The exhaust manifold 61 is disposed at the cylinder head 47. The exhaust pipe 62 is connected to a front end portion of the exhaust manifold 61. The muffler 63 is connected to a rear end portion of the exhaust pipe 62. More specifically, the exhaust pipe 62 extends obliquely downwardly toward the front from the front end portion of the exhaust manifold 61, curves laterally to the right in the vehicle width direction and then rearwardly along a right lower portion of the vehicle body, and is eventually connected to the muffler 63 on the right of the swing arm 14.

The transmission 44 includes an output shaft 44a on which a drive sprocket 39 is mounted. A chain 65 is trained over the drive sprocket 39 and a driven sprocket 49 integrated with the rear wheel 16, so that a driving force is transmitted from the transmission 44 to the rear wheel 16.

A pair of left and right front fuel tanks 66 is disposed on both sides of part of the main frames 22, down frame 26, and engine 41. The pair of front fuel tanks 66 and the rear fuel tank 38 provide a large tank capacity for vehicles traveling over a long distance. In FIG. 1, reference numeral 67 denotes a cap that plugs a fuel filler port in the front fuel tanks 66.

A front stay 71 is fixed at the front of the head pipe 21. The front stay 71 that protrudes forwardly supports, for example, a headlight, rally equipment 73 such as a road book holder, and a windscreen 75.

A pair of left and right shrouds 76 covers an upper portion of the front fork 12 and an upper portion of the down frame 26 from both lateral sides. A skid plate 77 covers to protect front and lower portions of the engine 41 and a lower front side of the front fuel tanks 66.

A rider's step 82 and a side stand 83 are supported at a lower portion of the pivot frames 23 via a step bracket 81.

In FIG. 1, reference numeral 85 denotes a pair of left and right fork covers that cover a lower portion of the front fork 12 from the front; reference numeral 86 denotes a grip guard that covers a grip of the handlebar 31 from the front; reference numeral 87 denotes a rear fender that covers the rear wheel 16 from above; and reference numeral 88 denotes a mud guard disposed anterior to the rear wheel 16.

Figure 2:
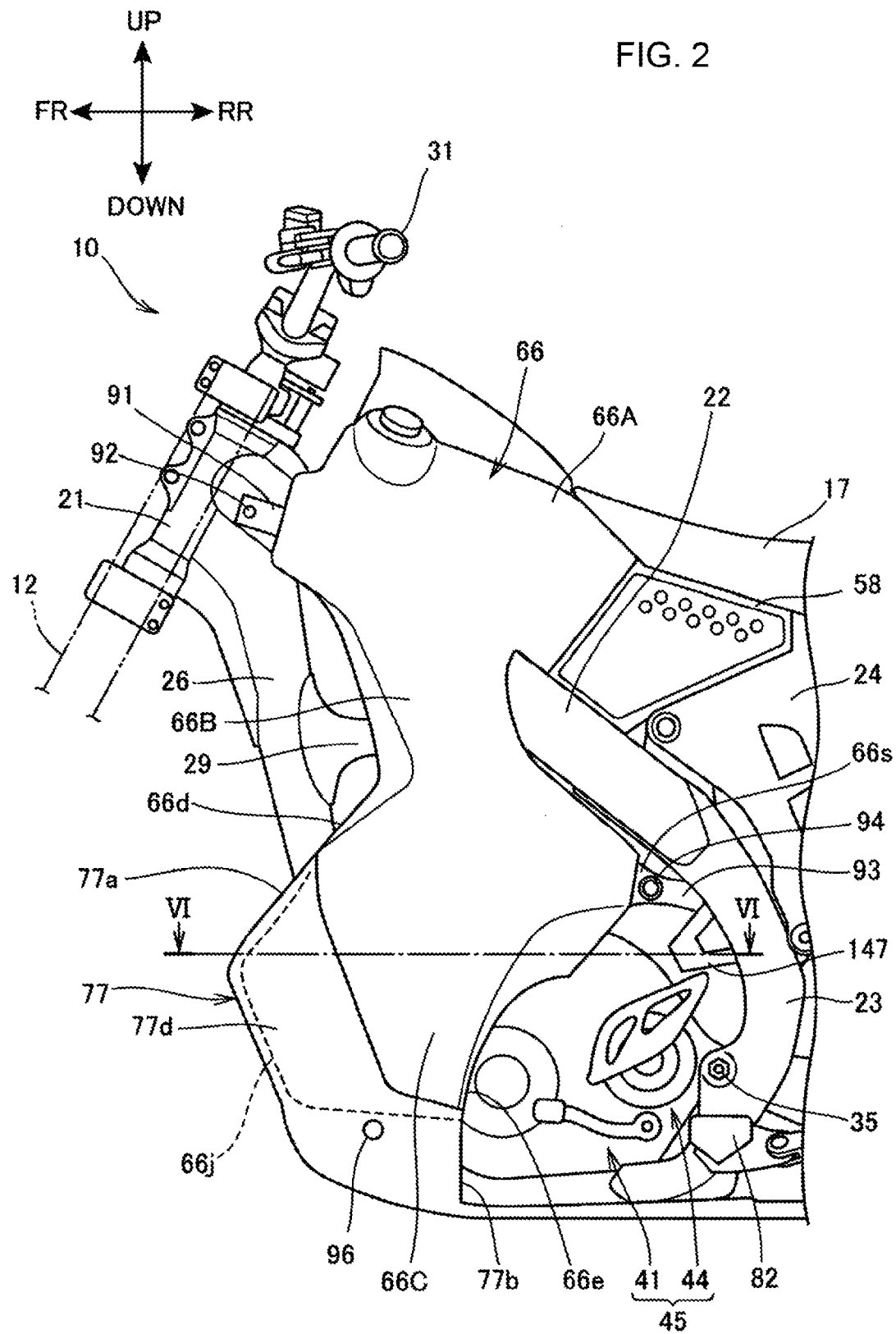
FIG. 2 is a left side elevational view showing main parts at a front portion of the motorcycle according to the first embodiment.

FIG. 2 is a left side elevational view showing main parts at a front portion of the motorcycle 10 according to the first embodiment. It is noted that part of the front fork 12, the front wheel 13, and the shrouds 76 that are shown in FIG. 1 are omitted in FIG. 2.

As shown in FIG. 2, each of the front fuel tanks 66 includes, in order from above downward, an upper tank portion 66A, a middle tank portion 66B, and a lower tank portion 66C integrated with each other. The upper tank portion 66A has a front end portion attached with a screw 92 to the main frame 22 via a tank bracket 91. The lower tank portion 66C has a rear end portion 66s attached with a screw 94 to the pivot frame 23 via a tank bracket 93.

The upper tank portion 66A extends from a lateral outside in the vehicle width direction of the main frame 22 to a portion above the main frame 22. The air cleaner 58 is disposed in rear of the upper tank portion 66A. The middle tank portion 66B assumes a portion constricted relative to the upper tank portion 66A and the lower tank portion 66C. The lower tank portion 66C is disposed below the main frame 22 and the reinforcing frame 29.

The lower tank portion 66C has a front end portion covered in the skid plate 77 from the front and lateral sides. The skid plate 77 has an upper wall 77a that extends obliquely downwardly toward the front so as to be continuous with a front portion upper surface 66d of the lower tank portion 66C. The skid plate 77 further has a side wall 77b extending up to a lower end rear edge portion 66e of the lower tank portion 66C and attached with a screw 96 to the lower tank portion 66C.

Figure 3:
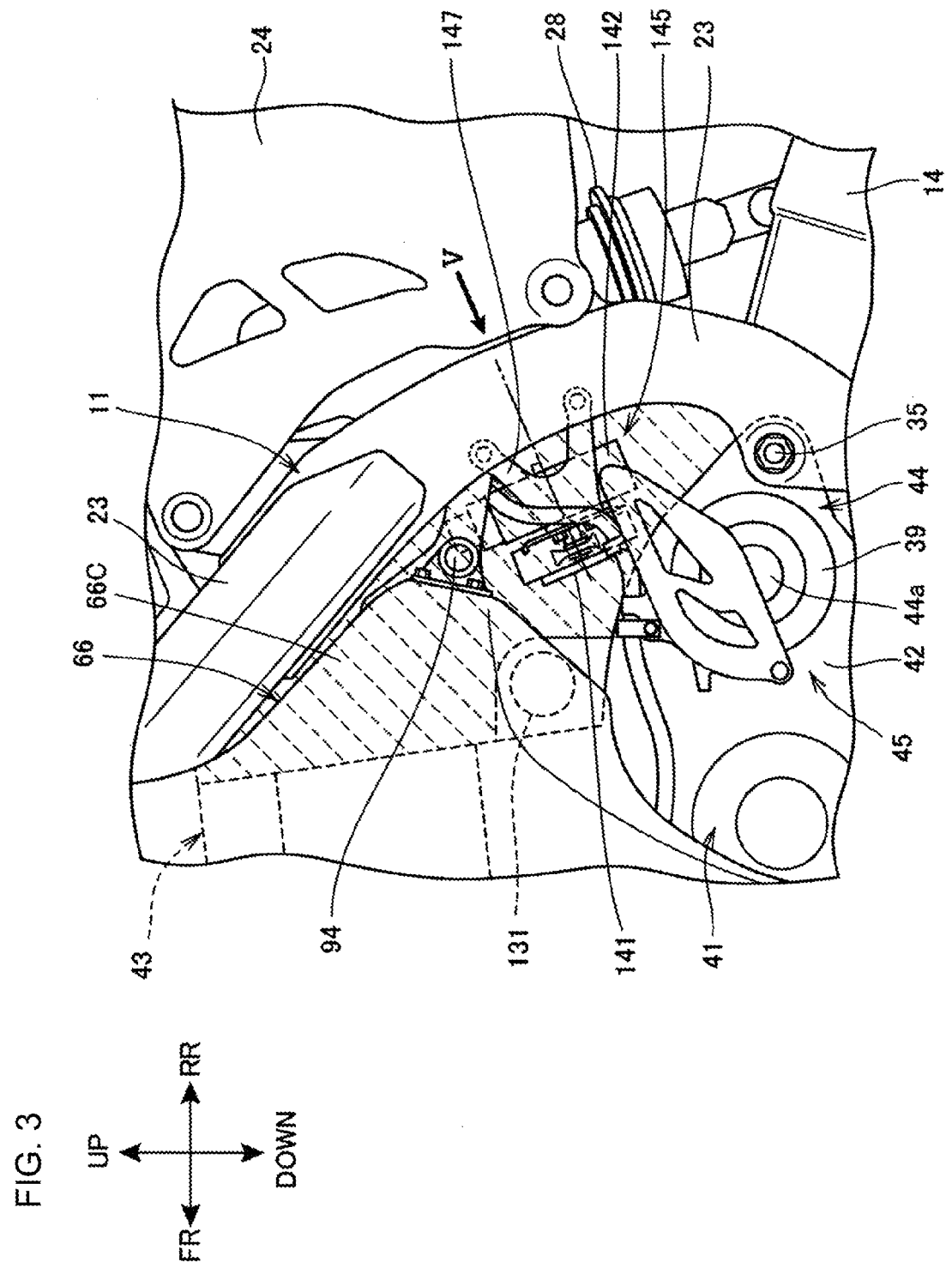
FIG. 3 is a left side elevational view showing main parts of a first ECU and a second ECU as electrical components, and around the first ECU and the second ECU in the first embodiment.

FIG. 3 is a left side elevational view showing main parts of a first ECU 141 and a second ECU 142 as electrical components, and around the first ECU 141 and the second ECU 142 in the first embodiment.

A first engine control unit 141 and a second engine control unit 142 are disposed at positions anterior to the pivot frames 23, posterior to the cylinder portion 43 of the engine 41 and above the crankcase 42. In the following, the first engine control unit 141 will be referred to as the "first ECU 141" and the second engine control unit 142 will be referred to as the "second ECU 142."

It is noted that, in the first embodiment, although the first ECU 141 and the second ECU 142 as electrical component control, for example, ignition timing, fuel injection timing, an idle speed, and an exhaust gas recirculation amount of the engine 41 using signals from various types of sensors, the first ECU 141 and the second ECU 142 may be configured as commonly found electrical components.

Specifically, the first ECU 141 and the second ECU 142 are disposed posterior to a starter motor 131 mounted on the crankcase 42, posterior to rear ends of the lower tank portions 66C of the front fuel tanks 66, and below connections between the main frames 22 and the pivot frames 23. To state the foregoing differently, the first ECU 141 and the second ECU 142 are disposed, in a side view, in a space 145 surrounded by the crankcase 42, the cylinder portion 43, the main frames 22, and the pivot frames 23 (a portion hatched with broken lines).

The disposition of the first ECU 141 and the second ECU 142 in the space 145 represents results of an attempt to improve maintainability by effectively using a dead space in the vehicle body and centrally disposing a plurality of electrical components with which the vehicle is equipped and, as described below, consideration given to ensure appropriate vehicle body stiffness and to a thermal effect.

Figure 4:
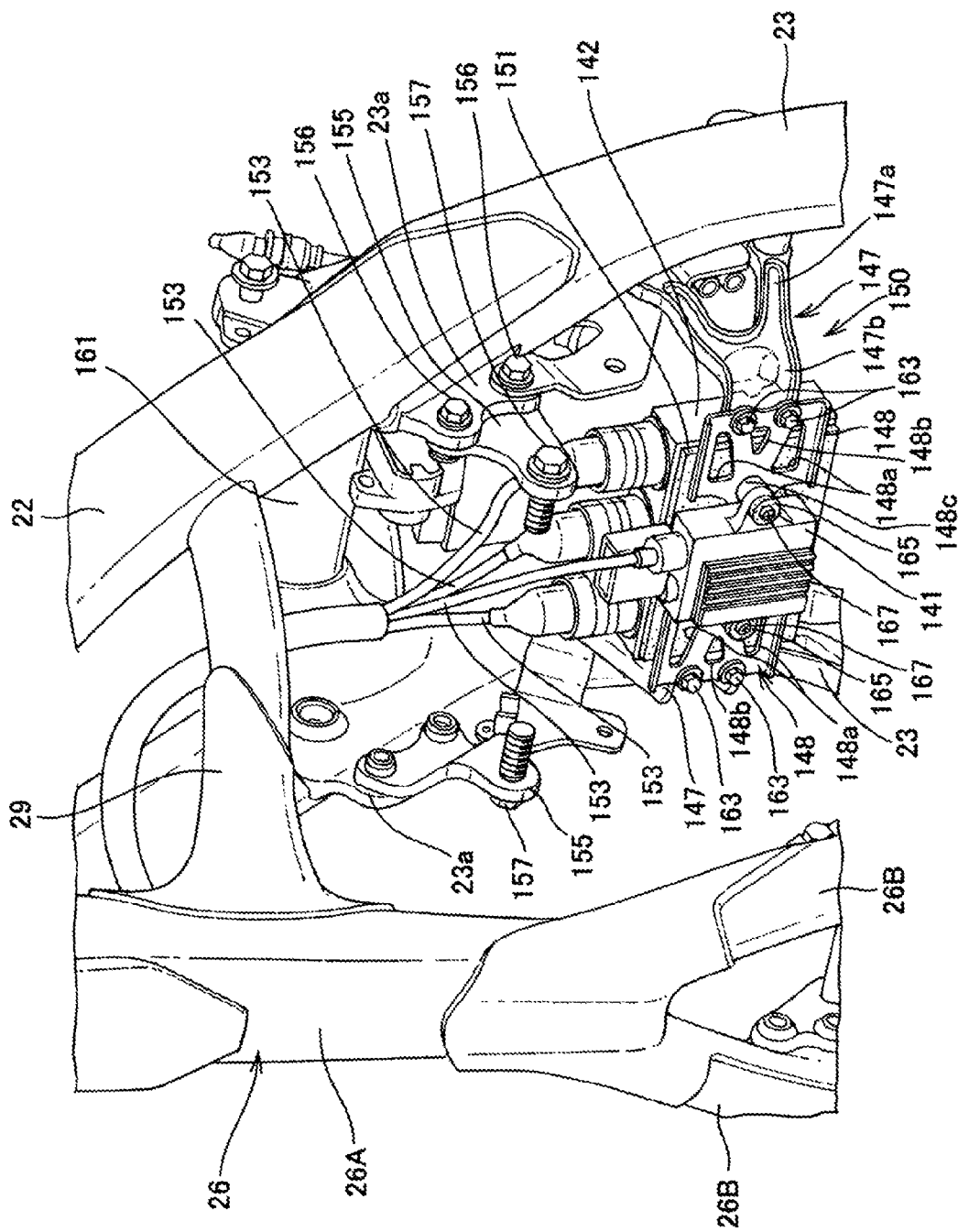
FIG. 4 is a perspective view showing an arrangement of the first ECU and the second ECU, and parts therearound in the first embodiment.

FIG. 4 is a perspective view showing the first ECU 141 and the second ECU 142, and parts therearound in the first embodiment.

A suspension stay 147 is fitted to each of the left and right pivot frames 23. A cross plate 148 is attached to each of the suspension stays 147. The first ECU 141 is supported by the left and right cross plates 148. Additionally, the second ECU 142 disposed posterior to the first ECU 141 is supported by the left and right suspension stays 147. Harnesses 153 are connected to the first ECU 141 and the second ECU 142.

A plate member 151 formed of rubber or another elastic body having a shock absorbing effect is disposed between the first ECU 141 and the left and right suspension stays 147, and the second ECU 142. The plate member 151 is affixed to a front surface of the second ECU 142.

Each of the left and right suspension stays 147 includes a V-shaped extended portion 147a and an inwardly bent portion 147b. The V-shaped extended portion 147a is attached to the corresponding pivot frame 23 and has a V-shape extending obliquely downwardly toward the front. The inwardly bent portion 147b is integrally bent toward the inside in the vehicle width direction from a distal end portion of the V-shaped extended portion 147a. The V-shaped extended portion 147a has vertically bifurcated ends attached to the pivot frame 23. This arrangement provides a good support for the first ECU 141, the second ECU 142, and other parts particularly stably in vertical vibrations.

The plate-shaped cross plate 148 extending inwardly in the vehicle width direction is further attached to the inwardly bent portion 147b with a plurality of bolts 163. The cross plate 148 has a plurality of thinning holes 148a, 148b for reduction in weight.

The first ECU 141 is elastically supported by the left and right cross plates 148. Specifically, the first ECU 141 is supported by the left and right cross plates 148 via mount rubbers 165. The pair of left and right suspension stays 147 and the pair of left and right cross plates 148 constitute an ECU suspension member 150. In FIG. 4, reference numeral 167 denotes a screw that secures the mount rubber 165 between a boss portion 148c provided at an inner end portion of the cross plate 148 and the first ECU 141 side.

The ECU suspension member 150 is extended obliquely downwardly toward the front and inwardly in the vehicle width direction from the left and right pivot frames 23, thereby supporting the first ECU 141. Consequently, the configuration of the ECU suspension member 150 can offer appropriate stiffness thereof, thereby preventing general stiffness of the vehicle body frame 11 (see FIG. 1) from becoming excessively high. Stiffness of the vehicle body frame 11 can thus be appropriately set to thereby improve running performance of the vehicle, for example, turning performance.

In addition, the elastic support for the first ECU 141 by the mount rubbers 165 relative to the left and right cross plates 148 can even further prevent stiffness between the left and right pivot frames 23 by the ECU suspension member 150 and the first ECU 141 described above from becoming excessively high. Furthermore, the elastic support allows a load or vibration not to readily act on the first ECU 141, so that the first ECU 141 can be protected.

The second ECU 142 is formed larger in size than the first ECU 141. This tends to cause an airflow to be blown against the second ECU 142, thus promoting cooling of the second ECU 142. The plate member 151 formed of rubber or another elastic body is disposed between the first ECU 141 and the second ECU 142. Thus, there is no direct contact between the first ECU 141 and the second ECU 142, so that the first ECU 141 and the second ECU 142 can be protected from, for example, wear and damage. Additionally, heat transfer between the first ECU 141 and the second ECU 142 is shut off and thus a temperature rise can be reduced. It is noted that the plate member 151 may be formed of a sponge or expanded polystyrene as a shock absorbing material.

The left and right pivot frames 23 each have an engine support portion 23a formed integrally therewith at an upper end portion thereof. The engine support portion 23a protrudes toward the side of the engine 41 (see FIG. 2). An engine hanger member 155 is attached to each of the engine support portions 23a with a plurality of bolts 156. The cylinder portion 43 (see FIG. 2) of the engine 41 (see FIG. 2) is supported at distal end portions of the engine hanger members 155. In FIG. 4, reference numeral 157 denotes a bolt that attaches the engine hanger member 155 to the cylinder portion 43.

A cross frame 161 that extends in the vehicle width direction connects together distal end portions of the left and right pivot frames 23. The rear cushion unit 28 (see FIG. 3) has an upper end portion swingably connected to a central portion in the vehicle width direction of the cross frame 161.

Figure 5:
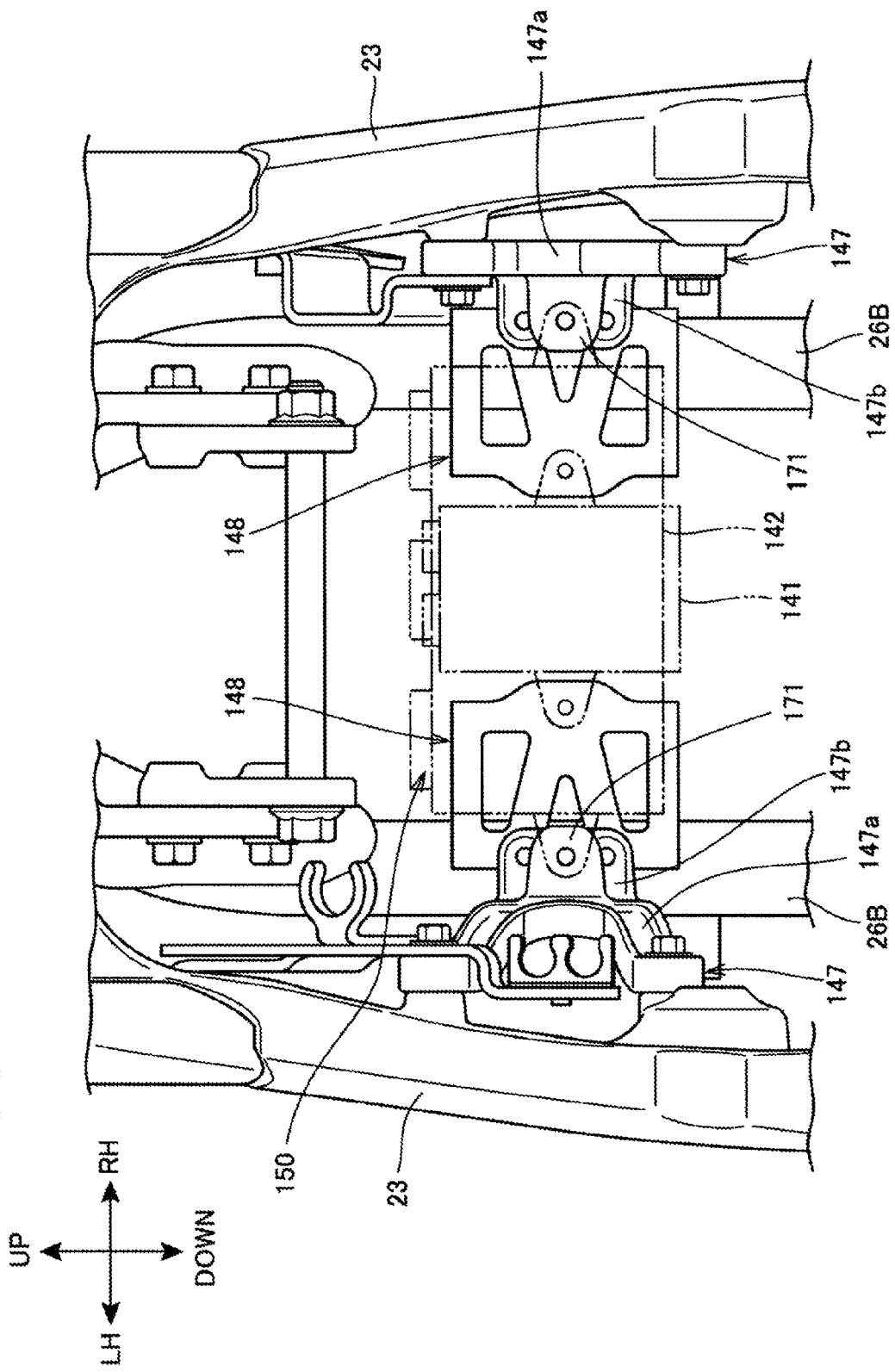
FIG. 5 is a view showing the first ECU and the second ECU, and parts therearound in the first embodiment, as viewed from a direction perpendicular to a forward inclination of the first ECU and the second ECU.

FIG. 5 is a view showing the first ECU 141 and the second ECU 142 in the first embodiment, as viewed from a direction perpendicular to a forward inclination of the first ECU 141 and the second ECU 142. FIG. 5 corresponds to a view on arrow V in FIG. 3.

The suspension stay 147 includes an inwardly protruding portion 171 that protrudes toward the inside in the vehicle width direction from the V-shaped extended portion 147a at a position posterior to the inwardly bent portion 147b.

Because the first ECU 141 is elastically supported by the left and right cross plates 148, any displacement in each of the left and right cross plates 148 can be absorbed by the mount rubbers 165 (see FIG. 5) as elastic members to thereby prevent a load from acting on the first ECU 141.

Additionally, the second ECU 142 is elastically supported via a rubber mount (not shown) on the left and right inwardly protruding portions 171. This arrangement can prevent any load from acting on the second ECU 142 as with the first ECU 141.

Figure 6:
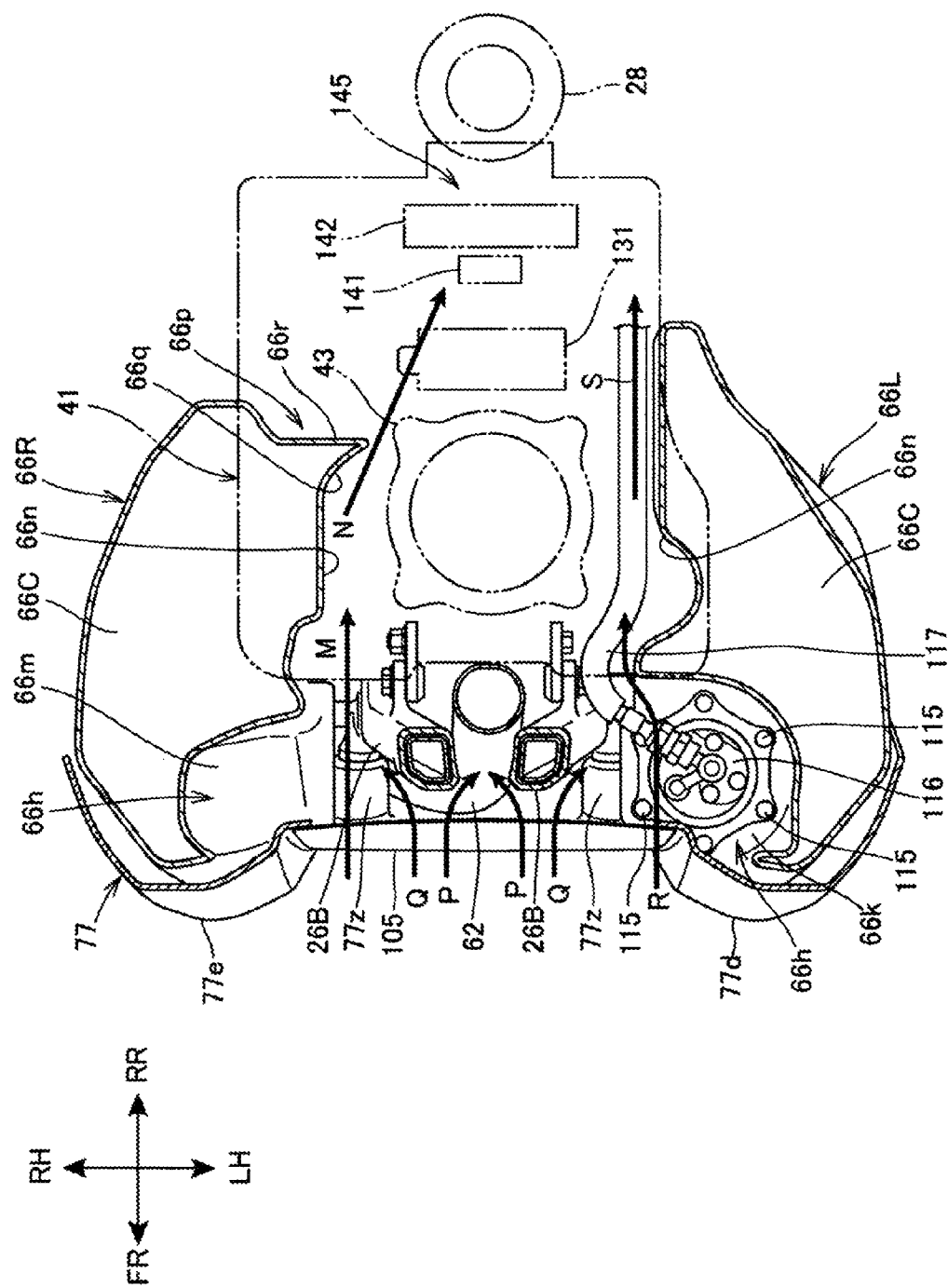
FIG. 6 is a cross-sectional view taken along line VI-VI in FIG. 2.

FIG. 6 is a cross-sectional view taken along line VI-VI in FIG. 2.

Let 66L and 66R denote the left and right front fuel tanks 66 (see FIG. 2), respectively. The left and right front fuel tanks 66L and 66R each have a tank recess 66h disposed on the inside in the vehicle width direction at a front portion. The left and right tank recesses 66h have bottom surfaces 66k and 66m formed therein, respectively. A fuel pump 116 is attached to the bottom surface 66k of the left front fuel tank 66L with a plurality of bolts 115.

The skid plate 77 has an opening formed at a central portion in the vehicle width direction. A mesh member 105 formed of wire netting is fixed so as to overlap the opening. The skid plate 77 includes bulged portions 77d and 77e on both of left and right lateral sides of the mesh member 105. In FIG. 6, reference numeral 77z denotes protruding portions formed on the skid plate 77. The protruding portions 77z protrude rearwardly and are attached to the down frame lower portions 26B.

The exhaust pipe 62 is disposed to extend in the fore-aft direction between the left and right down frame lower portions 26B. The exhaust pipe 62 and the cylinder portion 43 are disposed posterior to the mesh member 105. A delivery side fuel pipe 117 is disposed so as to extend in the fore-aft direction between the cylinder portion 43 and the left front fuel tank 66L.

A starter motor 131 disposed on the crankcase 42 (see FIG. 1) is disposed posterior to the cylinder portion 43. In addition, the first ECU 141 and the second ECU 142 are disposed posterior to the starter motor 131. Additionally, the rear cushion unit 28 is disposed posterior to the first ECU 141 and the second ECU 142.

As such, the first ECU 141 and the second ECU 142 are disposed in the space 145 by effectively using a sub-space posterior to the starter motor 131 and anterior to the rear cushion unit 28.

The right front fuel tank 66R has an inner wall 66n. The inner wall 66n includes an inner wall protruding portion 66p at a rear end portion thereof. The inner wall protruding portion 66p protrudes to the inside in the vehicle width direction. The inner wall protruding portion 66p has a front surface 66q and a rear surface 66r. The front surface 66q, as it extends rearwardly, gradually extends inwardly in the vehicle width direction to form an arcuate shape in its cross section. The rear surface 66r extends in the vehicle width direction. These arrangements result in an airflow being formed to be oriented toward the starter motor 131, the first ECU 141, and the second ECU 142.

The foregoing causes the airflow that has blown from the front of the vehicle through the mesh member 105 and entered the side of the engine 41 to flow, as indicated by an arrow M, from an area between the cylinder portion 43 and the inner wall 66n obliquely leftward toward the rear by using the inner wall protruding portion 66p as indicated by an arrow N, thereby cooling the starter motor 131, the first ECU 141, and the second ECU 142.

In addition, the airflow that has passed the mesh member 105 is divided into left and right streams at each of the left and right down frame lower portions 26B as indicated by arrows P and Q to flow toward the side of the engine 41. As indicated by arrows R and S, the air that has flowed past the tank recess 66h in the left front fuel tank 66L flows toward the rear through an area between the left front fuel tank 66L and the cylinder portion 43.

The left front fuel tank 66L has a rear end that extends further toward the rear than the right front fuel tank 66R. The rear end of the left front fuel tank 66L is substantially aligned in the fore-aft direction with a rear end of the starter motor 131 disposed posterior to the cylinder portion 43. The right front fuel tank 66R has a rear end substantially aligned in the fore-aft direction with a rear end of the cylinder portion 43. The disposition of the left and right front fuel tanks 66L and 66R in the foregoing manner allows the left and right front fuel tanks 66L and 66R to be shaped differently depending on, for example, a difference in dispositions of parts between the left- and right-hand sides of the vehicle body and further allows the tank capacity to be increased.

As described above with reference to FIGS. 1 and 3, in the electrical component mounting structure for the motorcycle 10 as a saddle-riding type vehicle, in which electrical components including the first ECU 141 are mounted in the vehicle body frame 11 that includes: the main frames 22 that extends downwardly toward the rear from the head pipe 21 and that suspends the power unit 45; and the pivot frames 23 that extend downwardly from the rear ends of the main frames 22 along both lateral sides in the vehicle width direction, the power unit 45 includes the crankcase 42 and the cylinder portion 43 that protrudes from the crankcase 42, and the first ECU 141 is disposed, in a side view, anterior to the left and right pivot frames 23, posterior to the cylinder portion 43, and above the crankcase 42.

The foregoing arrangements allow the first ECU 141 to be disposed using effectively the dead space created between the power unit 45 and the pivot frames 23 in the side view. In this case, because the first ECU 141 is disposed near the power unit 45, the following measures are taken in view of the possible thermal effect. The following measures are taken in view also of a possible effect on the vehicle running performance caused by increased stiffness of the vehicle body frame 11 as a result of increased stiffness of the members for supporting the first ECU 141.

As shown in FIGS. 4 and 5, the ECU suspension member 150 that supports the first ECU 141 includes the pair of left and right suspension stays 147 that extend from the left and right pivot frames 23 toward the front, specifically, downwardly toward the front and the pair of left and right cross plates 148 as the cross members that extend from the left and right suspension stays 147 inwardly in the vehicle width direction and the first ECU 141 is supported in a condition of extending across the left and right cross plates 148. The first ECU 141 is supported by a member having low stiffness without the left and right pivot frames 23 being directly connected with, for example, a part that forms part of the vehicle body frame, such as a cross member. Thus, the size of the vehicle body frame 11 can be reduced to achieve reduction in size and weight and the stiffness of the vehicle body frame 11 can be prevented from increasing excessively. This can achieve improved vehicle running performance, for example, turning performance.

The cross plate 148 is plate-shaped and has the thinning holes 148a and 148b formed at least in part thereof. This allows stiffness of the ECU suspension member 150 to be made appropriate. Thus, the stiffness of the vehicle body frame 11 can be prevented from becoming excessively high for the improved vehicle turning performance. Additionally, the thinning holes 148a and 148b can reduce weight of the cross plate 148.

Because the first ECU 141 is elastically supported by the cross plate 148, stiffness of a connecting member including the ECU suspension member 150 and the first ECU 141 and connecting between the left and right pivot frames 23 can be made appropriate. Thus, the vehicle turning performance can be improved. Furthermore, a large external force or impact can be prevented from being transmitted from the left and right pivot frames 23 to the first ECU 141 via the ECU suspension member 150, so that the first ECU 141 can be protected.

The left and right suspension stays 147 support the second ECU 142 that is separate from the first ECU 141 and the second ECU 142 is disposed posterior to the first ECU 141. Thus, the first ECU 141 and the second ECU 142 can be collectively disposed. This enables an even more effective use of the dead space created between the power unit 45 and the pivot frames 23. Furthermore, the first ECU 141 and the second ECU 142 are supported by the same suspension stays 147, so that reduction can be achieved in the number of parts used and cost.

As shown in FIGS. 3 and 6, the first ECU 141 and the second ECU 142 are disposed posterior to the left and right front fuel tanks 66L and 66R that are supported on the main frames 22 and the inner wall protruding portion 66p as a guide portion disposed at the rear portion of the front fuel tanks 66L and 66R is oriented such that the airflow is supplied to the first ECU 141 and the second ECU 142. The inner wall protruding portion 66p of the front fuel tanks 66L and 66R thus allows the first ECU 141 and the second ECU 142 to be cooled by the airflow blown thereagainst, so that the first ECU 141 and the second ECU 142 can be disposed close to the power unit 45.

Figure 7:
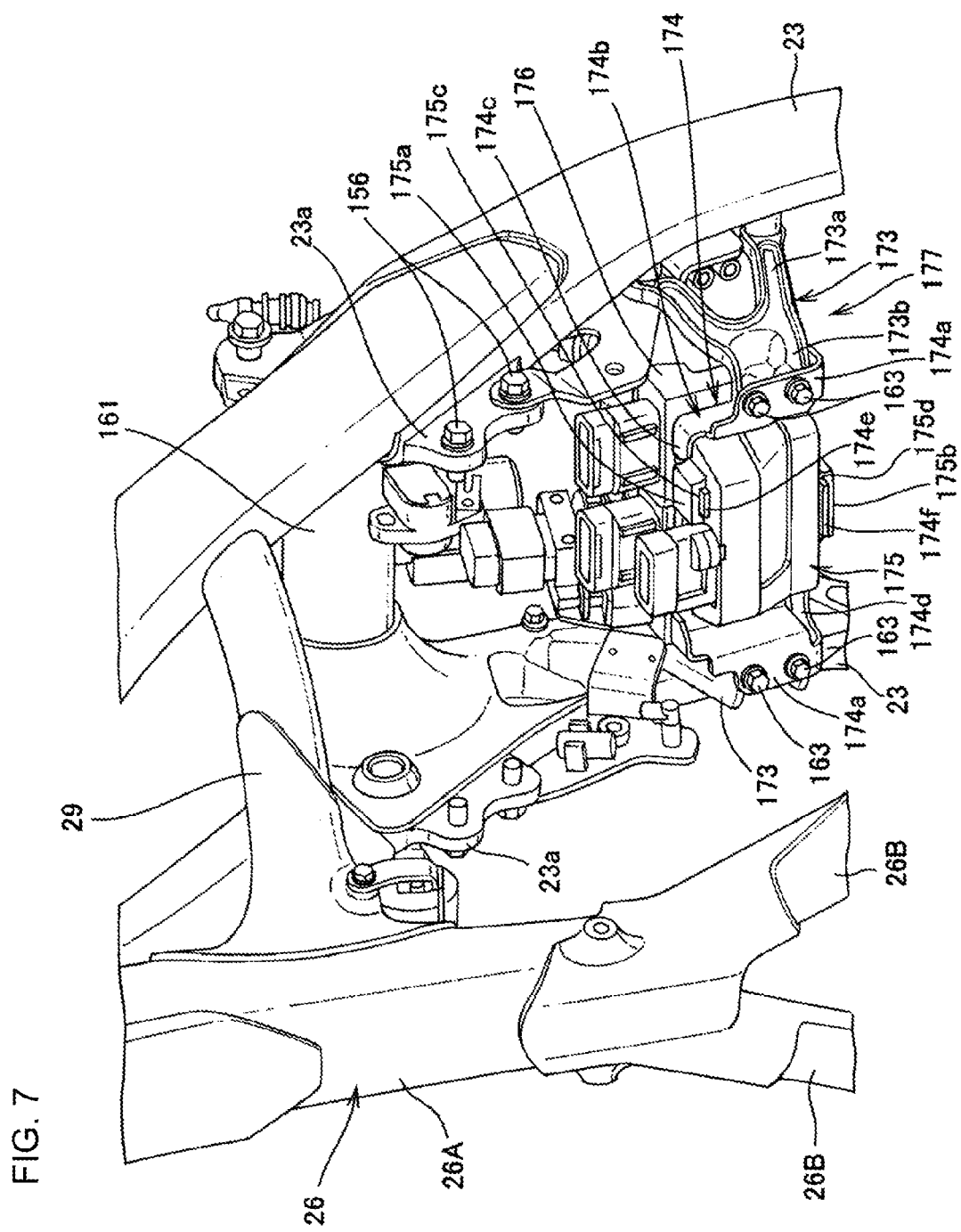
FIG. 7 is a perspective view showing an arrangement of a first ECU and a second ECU, and parts therearound in a second embodiment.

FIG. 7 is a perspective view showing an arrangement of a first ECU 175 and a second ECU 176, and parts therearound in a second embodiment. Like or corresponding parts as those used in the first embodiment shown in FIG. 4 are identified by the same reference numerals and detailed descriptions for those parts will be omitted.

A suspension stay 173 is attached to each of left and right pivot frames 23. An ECU bracket 174 extends across the left and right suspension stays 173. The first ECU 175 is attached to the front side of the ECU bracket 174. The second ECU 176 is attached to the rear side of the ECU bracket 174. The left and right suspension stays 173, 173 and the ECU bracket 174 constitute an ECU suspension member 177.

Each of the left and right suspension stays 173 includes a V-shaped extended portion 173a and an inwardly bent portion 173b. The V-shaped extended portion 173a is attached to the corresponding pivot frame 23 and has a V-shape extending obliquely downwardly toward the front. The inwardly bent portion 173b is integrally bent toward the inside in the vehicle width direction from a distal end portion of the V-shaped extended portion 173a. The V-shaped extended portion 173a has vertically bifurcated ends attached to the pivot frame 23.

The ECU bracket 174 is a plate bent into a predetermined form and includes a recessed portion 174b having a substantially box shape and a pair of left and right side flange portions 174a integrated with each other. The side flange portion 174a is fastened to the suspension stay 173 (specifically, the inwardly bent portions 173b) using a plurality of bolts 163. The recessed portion 174b is substantially shaped into a box recessed rearwardly between the left and right side flange portions 174a. Raised tabs 174e and 174f that protrude forwardly are formed on an upper wall 174c and a lower wall 174d, respectively, of the recessed portion 174b. Protruding portions 175a and 175b are formed at an upper portion and a lower portion, respectively, of the first ECU 175. Slits 175c and 175d are formed in the protruding portions 175a and 175b, respectively. The raised tabs 174e and 174f are press-fitted into slits 175c and 175d, respectively, which results in the first ECU 175 being fixed to the ECU bracket 174.

Figure 8:
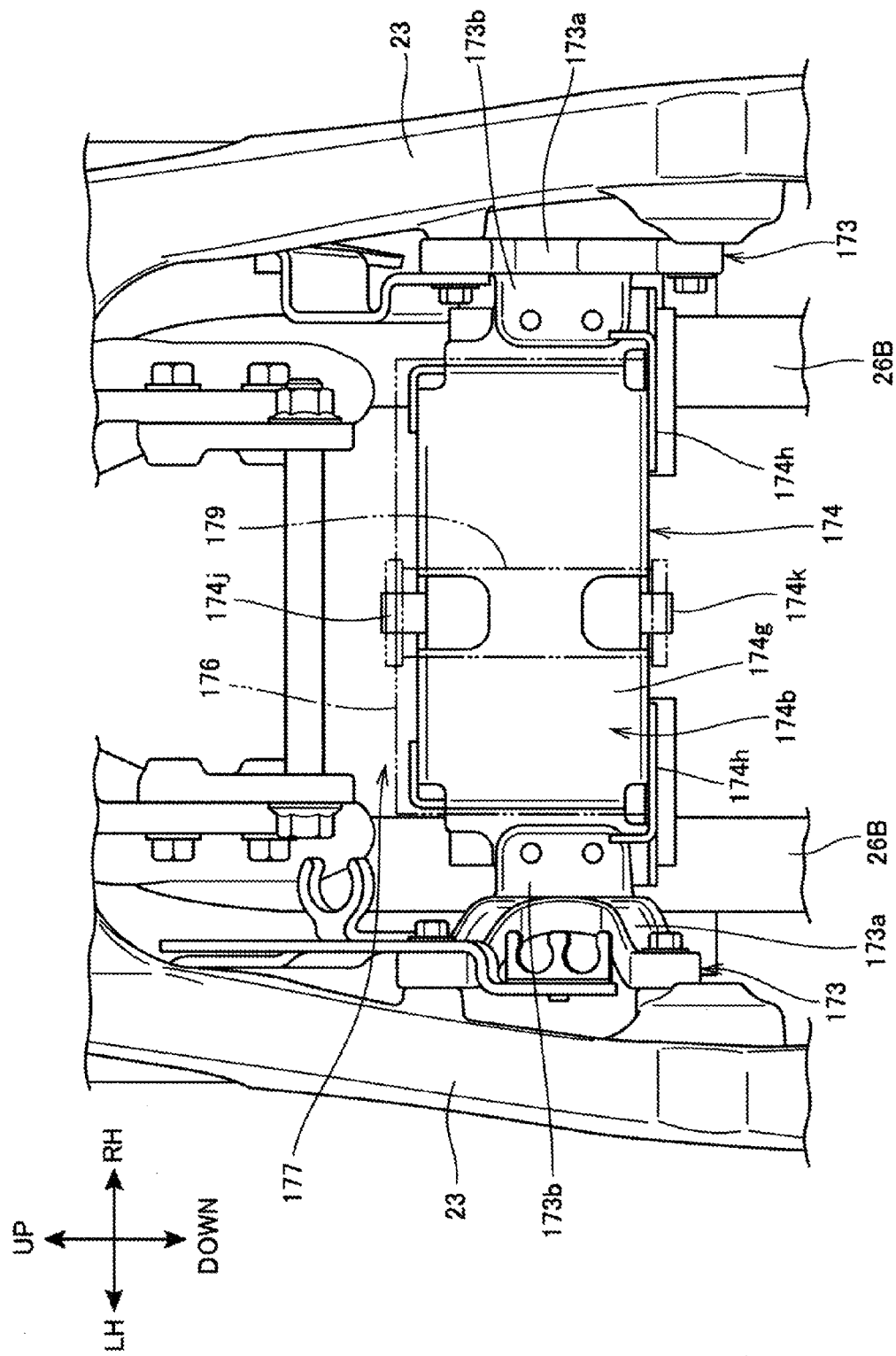

FIG. 8 is a view showing the first ECU 175 and the second ECU 176, and the parts therearound in the second embodiment, as viewed from a direction identical to the direction in which FIG. 5 is viewed.

The recessed portion 174b has a bottom wall 174g having a substantially box shape. The bottom wall 174g includes a pair of left and right ECU mounting portions 174h and a pair of band hooks 174j and 174k. The ECU mounting portions 174h protrude rearwardly so that the second ECU 176 can be mounted thereon. The pair of band hooks 174j and 174k provides catches onto which both ends of a rubber band 179 that holds the second ECU 176 in place can be hooked.

The suspension stays 173 and the ECU bracket 174 are each formed from a plate that is bent into a corresponding shape, thus having low stiffness. The suspension stays 173 and the ECU bracket 174 thus can improve, for example, vehicle turning performance. In addition, both the first ECU 175 (see FIG. 7) and the second ECU 176 can be supported by the ECU bracket 174. This can reduce the number of parts used, compared with an arrangement in which the first ECU 175 and the second ECU 176 are each provided with a dedicated supporting member. Additionally, the second ECU 176 is secured to the ECU bracket 174 using the rubber band 179. The second ECU 176 can thus be easily removed and remounted for the improved maintainability.

While the present invention has been particularly described with reference to various embodiments, it will be understood that the embodiments are not intended to limit the present invention and various changes in form and detail may be made therein without departing from the spirit and scope of the invention.

The present invention is applicable to not only the motorcycle 10, but also saddle-riding type vehicles that include, in addition to the motorcycle 10, any types of vehicle other than the motorcycle 10. It is noted that the saddle-riding type vehicle refers to general types of vehicles, in which a rider straddle the vehicle body, including not only motorcycles (including motorized bicycles), but also three-wheel or four-wheel vehicles categorized into the all-terrain vehicle (ATV).

The invention claimed is:

1. An electrical component mounting structure for a saddle-riding type vehicle, comprising:
   a vehicle body frame comprising:
      main frames extending downward toward rear of said vehicle from a head pipe, the main frames for suspending a power unit, and
      pivot frames extending downward from rear ends of the main frames to be disposed at left and right in a vehicle width direction, said electrical component mounting structure for supporting therein an electrical component including a first ECU, wherein
   the power unit comprises a crankcase and a cylinder portion that protrudes from the crankcase,
   the first ECU is disposed, in a side view, anterior to the left and right pivot frames, posterior to the cylinder portion, and above the crankcase,
   the first ECU and a second ECU are disposed posterior to a fuel tank supported by the main frames, and
   a guide portion formed at a rear portion of the fuel tank is oriented such that an airflow is supplied to the first ECU and the second ECU.

2. An electrical component mounting structure for a saddle-riding type vehicle, comprising:
   a vehicle body frame comprising:
      main frames extending downward toward rear of said vehicle from a head pipe, the main frames for suspending a power unit, and
      pivot frames extending downward from rear ends of the main frames to be disposed at left and right in a vehicle width direction, said electrical component mounting structure for supporting therein an electrical component including a first ECU,
      wherein the power unit comprises a crankcase and a cylinder portion that protrudes from the crankcase, and the first ECU is disposed, in a side view, anterior to the left and right pivot frames, posterior to the cylinder portion, and above the crankcase; and
   an ECU suspension member for supporting the first ECU, the ECU suspension member comprising:
      a pair of left and right suspension stays extending forward from the left and right pivot frames; and
      a pair of left and right cross members extending inward in the vehicle width direction from the left and right suspension stays, respectively,
      wherein the first ECU is supported in a condition of extending across the left and right cross members.

3. The electrical component mounting structure for a saddle-riding type vehicle according to claim 2, wherein the cross members are each plate-shaped and each having thinning holes.

4. The electrical component mounting structure for a saddle-riding type vehicle according to claim 3, wherein the first ECU is elastically supported by the cross members.

5. The electrical component mounting structure for a saddle-riding type vehicle according to claim 3, wherein
the left and right suspension stays support a second ECU separate from the first ECU, and
the second ECU is disposed posterior to the first ECU.

6. The electrical component mounting structure for a saddle-riding type vehicle according to claim 3, wherein
the first ECU and a second ECU are disposed posterior to a fuel tank supported by the main frames, and
a guide portion formed at a rear portion of the fuel tank is oriented such that an airflow is supplied to the first ECU and the second ECU.

7. The electrical component mounting structure for a saddle-riding type vehicle according to claim 2, wherein the first ECU is elastically supported by the cross members.

8. The electrical component mounting structure for a saddle-riding type vehicle according to claim 7, wherein
the left and right suspension stays support a second ECU separate from the first ECU, and
the second ECU is disposed posterior to the first ECU.

9. The electrical component mounting structure for a saddle-riding type vehicle according to claim 7, wherein
the first ECU and a second ECU are disposed posterior to a fuel tank supported by the main frames, and
a guide portion formed at a rear portion of the fuel tank is oriented such that an airflow is supplied to the first ECU and the second ECU.

10. The electrical component mounting structure for a saddle-riding type vehicle according to claim 2, wherein
the first ECU and a second ECU are disposed posterior to a fuel tank supported by the main frames, and
a guide portion formed at a rear portion of the fuel tank is oriented such that an airflow is supplied to the first ECU and the second ECU.

11. The electrical component mounting structure for a saddle-riding type vehicle according to claim 2, wherein
the left and right suspension stays support a second ECU separate from the first ECU, and
the second ECU is disposed posterior to the first ECU.

12. The electrical component mounting structure for a saddle-riding type vehicle according to claim 11, wherein
the first ECU and the second ECU are disposed posterior to a fuel tank supported by the main frames, and
a guide portion formed at a rear portion of the fuel tank is oriented such that an airflow is supplied to the first ECU and the second ECU.

* * * * *